Patented May 5, 1931

1,803,399

UNITED STATES PATENT OFFICE

ARTHUR LÜTTRINGHAUS AND HUGO WOLFF, OF MANNHEIM, AND HEINRICH NERESHEIMER, OF LUDWIGSHAFEN-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

MANUFACTURE OF DIBENZANTHRONYLS

No Drawing. Application filed June 5, 1926, Serial No. 114,011, and in Germany June 15, 1925.

It has been described in the U. S. Patent No. 1,564,423 that 2.2'-dibenzanthronyls corresponding to the general formula

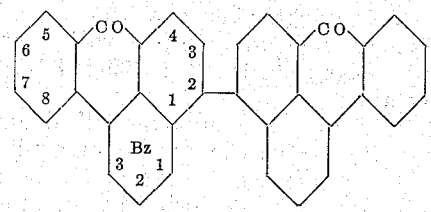

can be obtained by treating benzanthrone or its derivatives and analogues with alkaline condensing agents under more moderate conditions than those leading substantially to vat dyestuffs.

We have now found that 2.2'-dibenzanthronyl or its derivatives are also obtained by subjecting, instead of benzanthrones, a mixture of about molecular proportions of 2-halogen benzanthrone or its substitution products and benzanthrone or its derivatives having a free 2-position, to condensation with alkaline condensing agents under moderate conditions.

While in the process described in the U. S. Patent 1,564,423 2 molecules of benzanthrone are combined to 2.2'-dibenzanthronyl with the elimination of 2 atoms of hydrogen, according to the present invention 1 molecule of 2-halogen-benzanthrone combines with 1 molecule of benzanthrone with the elimination of 1 molecule of hydrogen halide. This reaction proceeds under still milder conditions than the former one and allows also of preparing unsymmetrically substituted 2.2'-dibenzanthronyls which according to the aforesaid process, for example by employing a mixture of 1 molecule of benzanthrone and 1 molecule of 6-chlor-benzanthrone are obtained, if at all, only in small quantities, the chief products being symmetrically substituted dibenzanthronyls. Unsymmetrically substituted dibenzanthronyls however can only be obtained as chief products and in a practically pure form by the process according to the present invention.

In case small quantities of dyestuff are formed simultaneously with the 2.2'-dibenzanthronyls, they may be extracted by treatment with an alkaline hydrosulfite solution.

The following examples will further illustrate how our present invention can be carried out in practice but the invention is not limited to these examples. The parts are by weight.

Example 1

6 parts of sodium are dissolved in 400 parts of anhydrous aniline in the presence of a small quantity of nickel oxid by heating and the resulting mixture is then cooled. The liquid now contains 30 parts of sodium anilide, partly in a dissolved state and partly in a state of suspension. A mixture of 20 parts of pure benzanthrone and 23 parts of 2-chlorbenzanthrone (melting at 204° C.) is introduced at 5° C. into the said suspension in a current of nitrogen. The temperature is hereby raised to 11° C. The color of the reaction mixture which is brownish yellow in the beginning, turns gradually reddish brown. The mixture is stirred for some hours at 11 to 12° C. while introducing nitrogen. It is then mixed with dilute hydrochloric acid and filtered. The residue remaining on the filter is treated with hot acetone until practically all soluble matter is dissolved. The crude 2.2'-dibenzanthronyl so obtained can be purified by recrystallization from xylene or chlorbenzene. It is identical with the product described in Example 1 of the U. S. Patent No. 1,564,423.

The temperature at which the reaction is carried out, may be varied within wide limits; for example, 2.2'-dibenzanthronyl is formed with a good yield and without formation of dyestuff also at 90 to 95° C.

Example 2

A mixture of 11.5 parts of 2-chlor-benzanthrone and 10.6 parts of 6-methyl-benzanthrone is introduced at 8° C. in a current of nitrogen into a suspension of 15 parts of sodium anilide in 200 parts of anhydrous aniline. The temperature is raised thereby to 12° C. The mixture is warmed to 14 to 15° C. and stirred for some hours until the reaction is complete. It is worked up as described in Example 1. The crude product so obtained forms a brownish yellow powder which dissolves in concentrated sulfuric acid with red color. It can be purified by recrystallization from boiling xylene whereby it is obtained in the form of glittering leaflets melting at 328° C. It is 6-methyl-2.2'-dibenzanthronyl.

*Example 3*

When carrying out the process described in Example 2 with 11.5 parts of 6-chlor-benzanthrone instead of 6-methyl-benzanthrone, the crude product forms a reddish yellow powder melting at 300 to 305° C. and forming an intensely red solution with concentrated sulfuric acid. By recrystallization from xylene 6-chlor-2.2'-dibenzanthronyl is obtained in the form of glittering yellowish brown leaflets melting at 312 to 314° C.

When employing 7-chlor-benzanthrone instead of 6-chlor-benzanthrone, 7-chlor-2.2'-dibenzanthronyl melting at 305° C. is obtained.

*Example 4*

A mixture of 10 parts of crystallized benzanthrone and 13 parts of crystallized 2.6-dichlor-benzanthrone is introduced at 0°C. in a current of nitrogen into a suspension of 17 parts of potassium anilide (prepared from 5.1 parts of potassium) in 200 parts of anhydrous aniline. The temperature is raised thereby to 8° C. and the color of the mixture turns brownish red. The mass is stirred for about 3 hours at the said temperature and poured into dilute hydrochloric acid. The orange colored reaction product is treated with hot acetone until practically all soluble matter is dissolved. The crude product is twice recrystallized from boiling xylene. It is identical with the 6-chlor-2.2'-dibenzanthronyl described in Example 3.

*Example 5*

A mixture of 13 parts of crystallized 2.7-dichlor-benzanthrone (melting point 278° C.) and 11.5 parts of crystallized 7-chlor-benthrone (melting point 182 to 184° C.) is introduced at 10° C. in a current of nitrogen into a suspension of 15 parts of sodium anilide in 200 parts of anhydrous aniline. The temperature is raised to 14° C. The mass is stirred for some hours until the reaction is complete, and poured into dilute hydrochloric acid. The mixture is filtered and the residue is dried. The orange colored crude product so obtained melts at 310 to 315° C. and can be obtained in a practically pure state by treatment with acetone. By recrystallization from dichlor-benzene 7.7'-dichlor-2.2-dibenzanthronyl is obtained in the form of small yellowish brown crystals melting above 370° C. and dissolving in concentrated sulfuric acid with red color.

In a similar manner, 6.6'-dichlor-2.2'-dibenzanthronyl melting above 370° C. is obtained from 2.6-dichlor-benzanthrone and 6-chlor-benzanthrone.

*Example 6*

30 parts of isopropyl alcohol are caused to run at 0 to 5° C. into a suspension of 60 parts of powdered potassium hydroxid, 10.8 parts of 2-chlor-benzanthrone and 10 parts of 6-methyl-benzanthrone in 300 parts of toluene while excluding air. The mixture is stirred ot the said temperature until the reaction is complete. The mixture is freed from toluene by distillation with steam and the product is purified by removing the alkaline solution by filtration and by washing with suitable solvents, for example acetone or pyridine. It forms a greenish yellow powder melting at 313 to 317° C. After recrystallization from trichlor-benzene the 6-methyl-2.2'-dibenzanthronyl identical with that described in Example 2 melts at 330 to 331° C.

We claim:

1. The process of producing 2.2'-dibenzanthronyls which comprises acting on a mixture of a 2-halogen-benzanthrone and a benzanthrone having a free 2-position with an alkaline condensing agent at a more moderate temperature than that leading substantially to vat coloring matters.

2. As new articles of manufacture, practically pure 2.2'-dibenzanthronyls in which one of the benzanthrone radicles is substituted by a halogen atom.

3. As new articles of manufacture, practically pure 2.2'-dibenzanthronyls in which one of the benzanthrone radicles is substituted by a chlorine atom.

4. As a new article of manufacture, practically pure 2.2'-dibenzanthronyl in which one of the benzanthrone radicles is substituted in the 6-position by a chlorine atom.

In testimony whereof we have hereunto set our hands.

ARTHUR LÜTTRINGHAUS.
HUGO WOLFF.
HEINRICH NERESHEIMER.